United States Patent
Sobanski et al.

(10) Patent No.: US 11,255,194 B2
(45) Date of Patent: Feb. 22, 2022

(54) VANE ARC SEGMENT PLATFORM FLANGE WITH CAP

(71) Applicant: United Technologies Corporation, Farmington, CT (US)

(72) Inventors: Jon E. Sobanski, Glastonbury, CT (US); Bryan H. Farrar, West Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 58 days.

(21) Appl. No.: 16/787,083

(22) Filed: Feb. 11, 2020

(65) Prior Publication Data

US 2021/0246788 A1    Aug. 12, 2021

(51) Int. Cl.
*F01D 5/06* (2006.01)
*F01D 5/14* (2006.01)
*F01D 5/28* (2006.01)

(52) U.S. Cl.
CPC ............. *F01D 5/066* (2013.01); *F01D 5/147* (2013.01); *F01D 5/282* (2013.01)

(58) Field of Classification Search
CPC ............. F01D 9/04; F01D 9/041; F01D 9/042
See application file for complete search history.

(56) References Cited

U.S. PATENT DOCUMENTS

| | | | |
|---|---|---|---|
| 8,500,392 B2 | 8/2013 | Durocher et al. | |
| 9,638,042 B2* | 5/2017 | Beaujard | F01D 9/042 |
| 10,132,170 B2 | 11/2018 | Garcia-Crespo et al. | |
| 10,180,073 B2 | 1/2019 | Tuertscher et al. | |
| 10,465,540 B2 | 11/2019 | Carr et al. | |
| 2013/0004296 A1* | 1/2013 | Propheter-Hinckley | F01D 5/284 |
| | | | 415/115 |
| 2014/0093363 A1 | 4/2014 | Ring et al. | |
| 2016/0084096 A1* | 3/2016 | Carr | F02C 3/04 |
| | | | 60/805 |
| 2020/0040748 A1 | 2/2020 | Gimat et al. | |

OTHER PUBLICATIONS

European Search Report for European Application No. 21155947.1 completed Jun. 8, 2021.

* cited by examiner

*Primary Examiner* — J. Todd Newton
*Assistant Examiner* — Cameron A Corday
(74) *Attorney, Agent, or Firm* — Carlson, Gaskey & Olds, P.C.

(57) ABSTRACT

A vane arc segment includes an airfoil piece that has a first platform, a second platform, and an airfoil section between the first platform and the second platform. At least the first platform is formed of a fiber-reinforced composite (FRC) and defines a radial flange. A cap is fitted on the radial flange.

20 Claims, 4 Drawing Sheets

VANE ARC SEGMENT PLATFORM FLANGE WITH CAP

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

A vane arc segment according to an example of the present disclosure includes an airfoil piece including a first platform, a second platform, and an airfoil section between the first platform and the second platform. At least the first platform is formed of a fiber-reinforced composite (FRC) and defines a radial flange. A cap is fitted on the radial flange.

In a further embodiment of any of the foregoing embodiments, the cap is metallic.

In a further embodiment of any of the foregoing embodiments, the cap is formed of a superalloy.

In a further embodiment of any of the foregoing embodiments, the cap is friction-fit on the radial flange.

In a further embodiment of any of the foregoing embodiments, the cap includes an acute corner.

In a further embodiment of any of the foregoing embodiments, the FRC is a laminate.

In a further embodiment of any of the foregoing embodiments, the laminate includes radially oriented fiber plies.

In a further embodiment of any of the foregoing embodiments, the cap includes first and second radial walls and a tangential wall joining the first and second radial walls.

In a further embodiment of any of the foregoing embodiments, the cap mechanically constrains the radial flange.

In a further embodiment of any of the foregoing embodiments, the FRC is a ceramic matrix composite.

A vane ring assembly according to an example of the present disclosure includes an airfoil piece that has a first platform, a second platform, and an airfoil section between the first platform and the second platform. The first platform defines a radial flange for interfacing with a mating component. The first platform is formed of a ceramic matrix composite. There is a mating component adjacent the radial flange, and an anti-wear element in an interface between the radial flange and the mating component.

In a further embodiment of any of the foregoing embodiments, the anti-wear element is metallic.

In a further embodiment of any of the foregoing embodiments, the anti-wear element is formed of a superalloy.

In a further embodiment of any of the foregoing embodiments, the anti-wear element includes first and second radial walls and a tangential wall joining the first and second radial walls.

In a further embodiment of any of the foregoing embodiments, the interface is a radial interface.

In a further embodiment of any of the foregoing embodiments, the anti-wear element is friction-fit on the radial flange.

A gas turbine engine according to an example of the present disclosure includes first and second support structures, and vane arc segments supported between the first and second support structures. Each said vane arc segment includes an airfoil piece that has a first platform, a second platform, and an airfoil section between the first platform and the second platform. At least the first platform is formed of a fiber-reinforced composite (FRC) and defines a radial flange. A cap is fitted on the radial flange.

In a further embodiment of any of the foregoing embodiments, the cap is non-destructively removable from the radial flange.

In a further embodiment of any of the foregoing embodiments, the cap is formed of a superalloy and is friction-fit on the radial flange.

In a further embodiment of any of the foregoing embodiments, the FRC is a laminate that includes radially oriented fiber plies and the cap mechanically constrains the radial flange.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
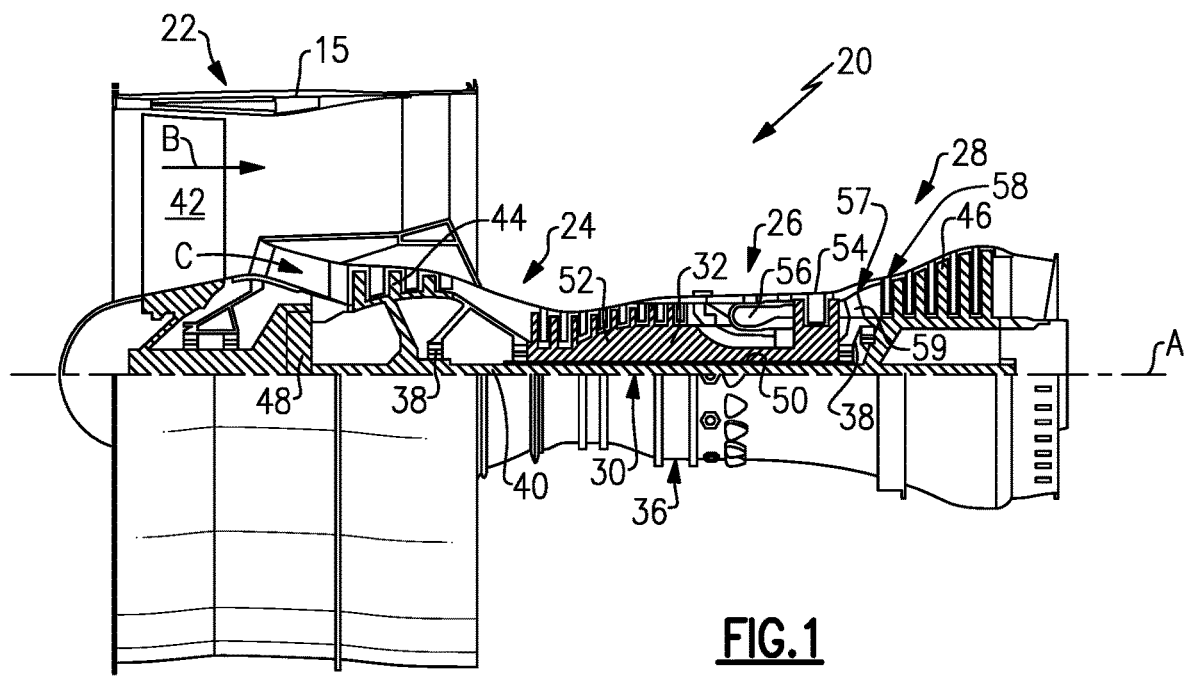
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
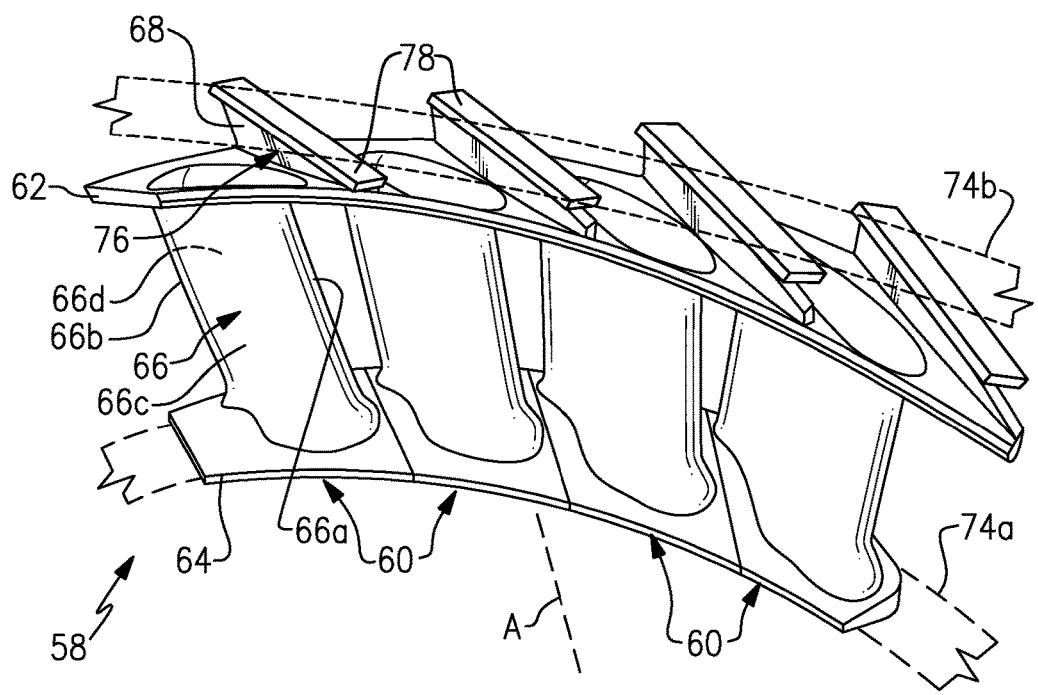
FIG. 2 illustrates a vane ring assembly of the engine.

FIG. 2 illustrates a representative portion of a vane ring assembly 58. The vane ring assembly 58 may be from the turbine section 28 of the engine 20 but is not limited thereto or to hot sections of the engine 20. The vane ring assembly 58 is made up of a plurality of vane arc segments 60 that are situated in a circumferential row about the engine central axis A. Although the vane arc segments 60 are shown and described with reference to application in the turbine section 28, it is to be understood that the examples herein are also applicable to structural vanes in other sections of the engine 20.

Each vane arc segment 60 is comprised of first and second platforms 62/64, and an airfoil section 66 that extends radially between the platforms 62/64. The airfoil section 66 is hollow and defines a leading end 66a, a trailing end 66b, and pressure and suction sides 66c/66d. At least the first platform 62, and more typically also the airfoil section 66 and the second platform 64, are formed of a fiber-reinforced composite (FRC).

The first platform 62 defines a radial flange 68 (also FRC) that extends along at least a portion of a circumferential mate face of the first platform 62. The radial flange 68 projects in the radial direction, is generally elongated, and runs along at least a portion of the extent of the circumferential mate face. In the illustrated example, the radial flange 68 is co-extensive with the circumferential mate face, although in modified examples the radial flange 68 may be somewhat shorter than the circumferential mate face. Most typically, the radial flange 68 runs along at least 50%, at least 60%, or at least 70% of the extent of the circumferential mate face.

The radial face of the flange 68 may have a planar profile or a curved profile. In the illustrated example, the radial face has a curved profile, which may be used to facilitate load transmission. In the illustrated example, the curved profile is that of a cylindrical surface segment. A cylindrical surface segment is a surface that has the shape of a section of a surface of a cylinder. For example, the cylindrical surface segment is that of a reference cylinder that has its main axis parallel to the central engine axis A. For instance, the main axis of the reference cylinder is co-linear with the central engine axis A.

In the illustrated example, the first platform 62 is a radially outer platform, and the second platform 64 is a radially inner platform. It is to be appreciated that modified examples are also contemplated, in which the platforms 62/64 are switched such that the first platform 62 is a radially inner platform and the second platform 64 is a radially outer platform. Additionally, the illustrated example the vane arc segments 60 are "singlets" in which each arc segment 60 has one airfoil section 66. Modified examples are also contemplated in which each arc segment is a "multiplet" that has more than one airfoil section 66, such as two or three airfoil sections 66.

The vane arc segments 60 are mounted in the engine 20 between inner and outer support structures 74a/74b, i.e., mating components. The support structures 74a/74b are not particularly limited and may be annular case structures or the like, and may include intermediate hardware between the case and the vane arc segments 60. The support structures 74a/74b are typically formed of, but are not limited to, metallic alloys that can bear the loads received. During operation of the engine 20 gases flow across the airfoil sections 66 and gaspath sides of the platforms 62/64. For vanes in the turbine section 28, the gases are hot combustion gases. The flow causes aerodynamic loads on the vane arc segments 60 that are reacted or transmitted to the support structures 74a/74b. Additionally, other loads from the interior of the engine 20 may be transmitted radially through the vane arc segments 60.

There is an interface 76 between each radial flange 68 and the support structure 74b. As shown, there is an anti-wear element 78 in the interface 76. For example, the anti-wear element 78 is fixed with the radial flange 68. The anti-wear element 78 blocks contact between the FRC that forms the flange 68 and the metallic alloy of the support structure 74a, thereby limiting wear there between.

For instance, aerodynamic loads are transmitted fully or substantially fully though the radial flange 68 to the support structure 74b. The loads, operational vibration, and/or other factors can cause relative movement between the radial flange 68 and the support structure 74b. The anti-wear element 78, however, is fixed with the radial flange 68 and thus contacts the support structure 74b rather than the radial flange 68 contacting the support structure 74b. In this regard, the anti-wear element 78 is formed of a material that provides a lower wear couple with the metallic alloy of the support structure 74b than the FRC of the flange 68. For instance, under the same engine operating condition, the wear couple between the element 78 and the support structure 74b is lower than what the wear rate would be between the flange 68 and the support structure 74b. In one example, the anti-wear element 78 is metallic and may be formed of a superalloy, such as a nickel- or cobalt-based superalloy. In turn, lower wear facilitates enhancing durability.

Figure 3A:
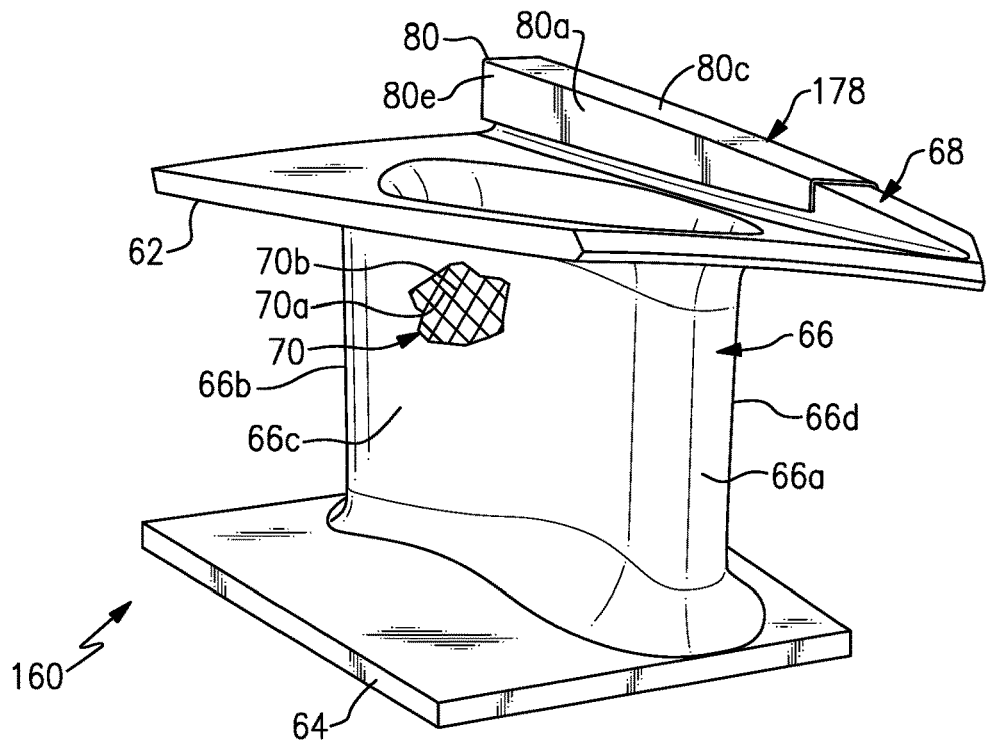
FIG. 3A illustrates an isolated view of a vane arc segment of a vane ring assembly.
Figure 3B:
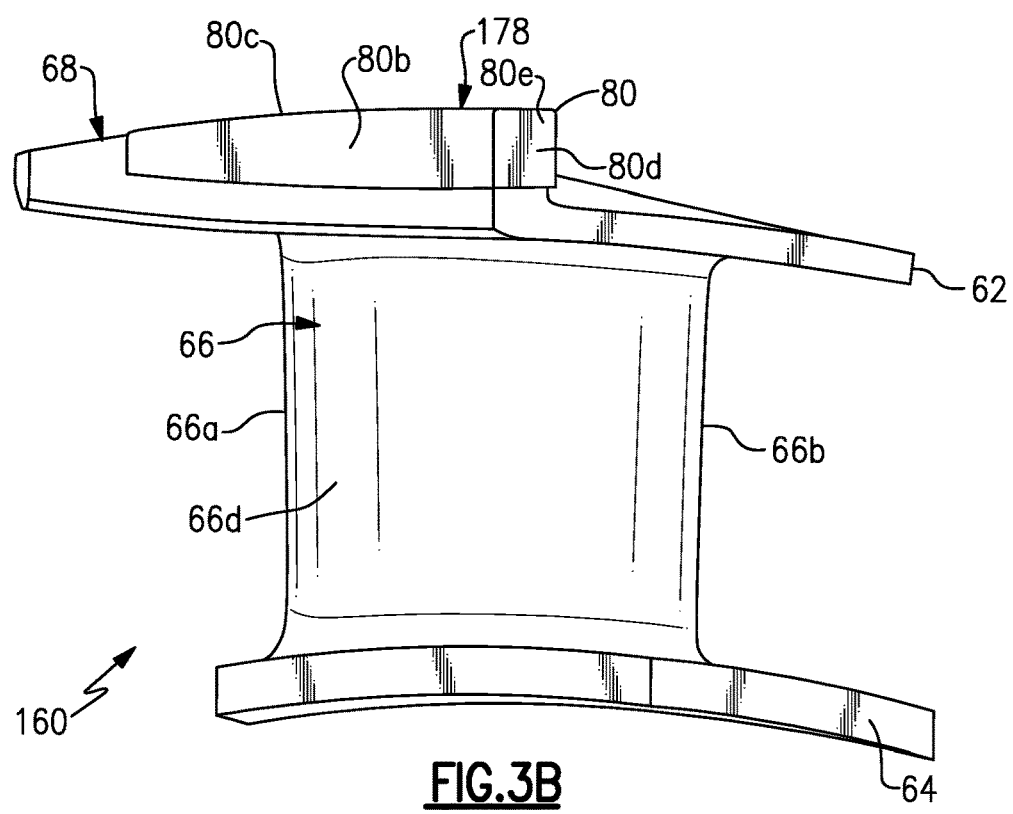
FIG. 3B illustrates another view of the vane arc segment of FIG. 3A.
Figure 3C:
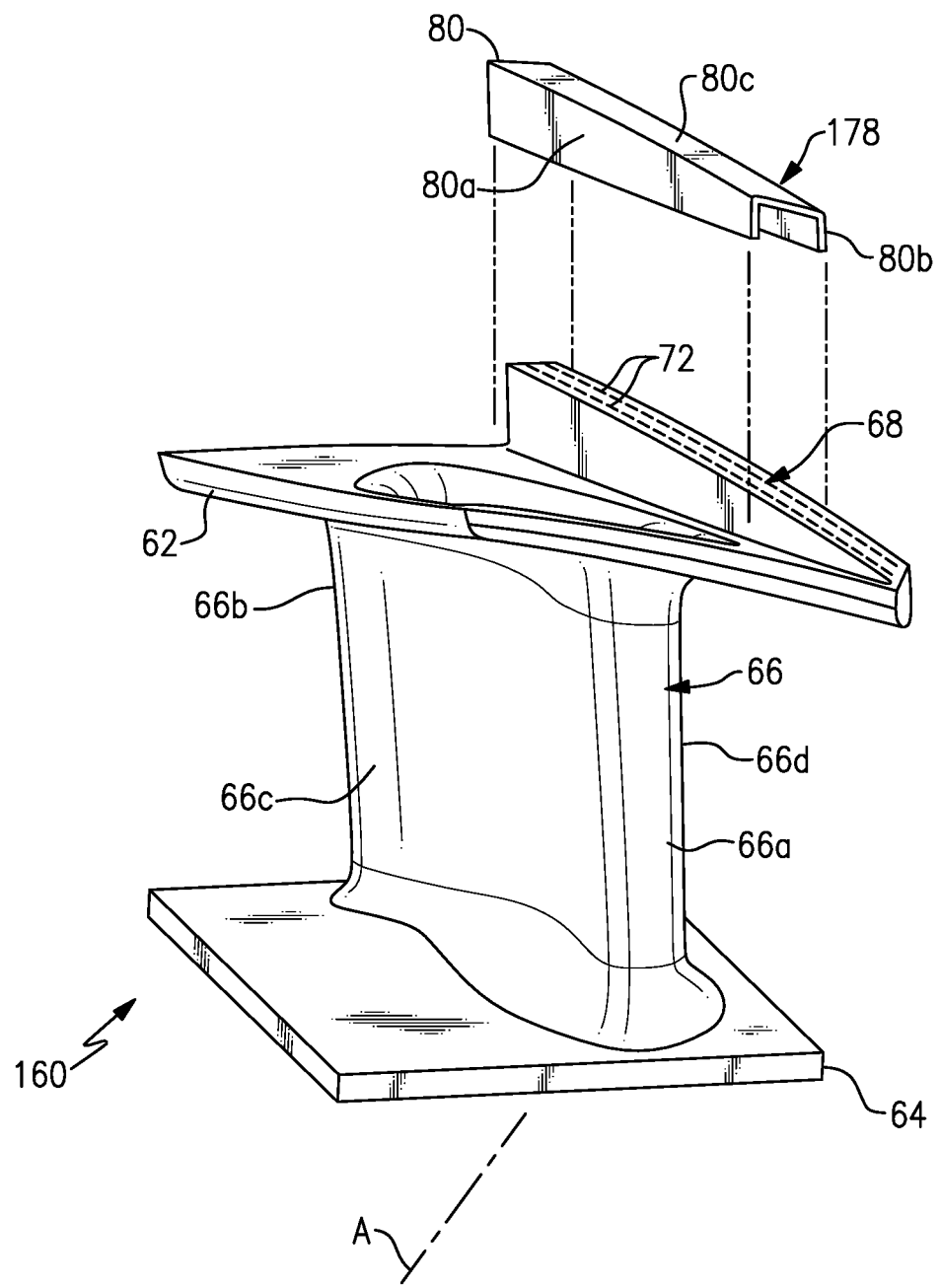
FIG. 3C illustrates an expanded view of the vane arc segment.

FIGS. 3A and 3B illustrate isolated views from different angles of another example vane arc segment 160, and FIG. 3C illustrates an expanded view of the vane arc segment 160. Equivalent elements are numbered the same between the examples herein. As shown in a cutaway portion of the vane arc segment 160 in FIG. 3A, the vane arc segment 60 is formed of an FRC 70. The FRC 70 includes fibers 70a that are disposed in a matrix 70b. The FRC 70 is either a ceramic matrix composite (CMC) or an organic matrix composite (OMC). For the CMC, the matrix 70b is ceramic. The ceramic may be, but is not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. For the OMC, the matrix 70b is an organic polymer, such as but not limited to, polyimide and bismaleimide (BMI). An example OMC may be polyimide or BMI matrix with carbon fibers, aramid fibers, ceramic fibers, or glass fibers, as examples.

Figure 4:
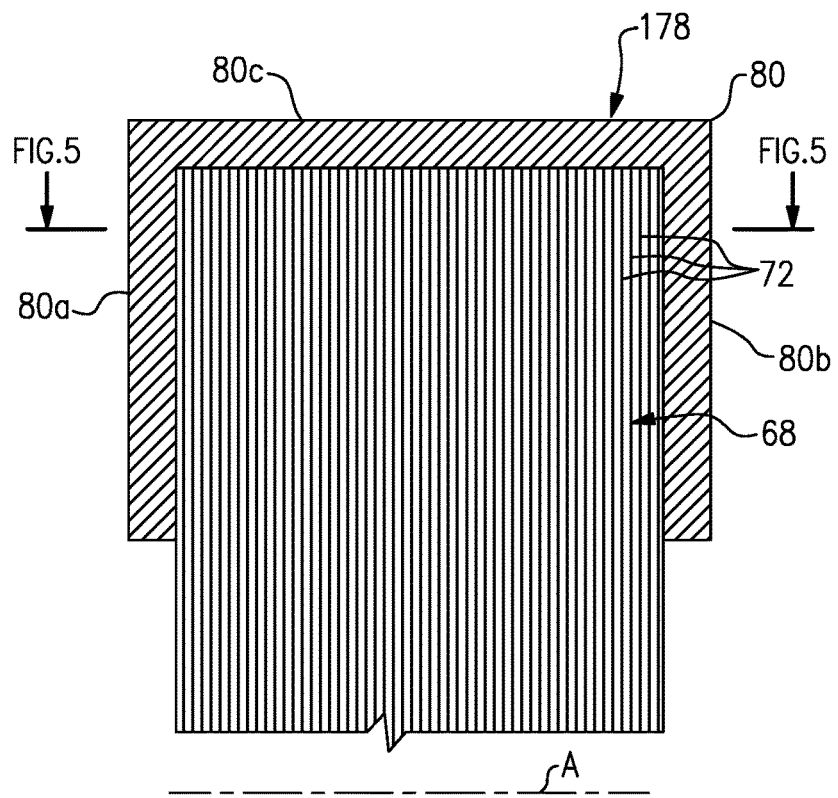
FIG. 4 illustrates a sectioned view through a flange and cap of a vane arc segment.

In this example, the FRC 70 forms the airfoil section 66 and the platforms 62/64. The fibers 70a are provided in a fiber structure, such as a laminate structure of stacked fiber plies 72, as best shown in the sectioned view through the flange 68 in FIG. 4. For instance, in the flange 68, the fiber plies 72 are radially oriented, i.e., the planes of the plies 72 span in the radial direction relative to the axis A. Each fiber ply 72 may have, but is not limited to, a woven or unidirectional fiber configuration. The fiber plies 72 may be continuous through the first platform 62, the airfoil section 66, and the second platform 64.

The vane arc segment 160 includes an anti-wear element 178. In this example, the anti-wear element 178 is a cap 80. The cap 80 includes radial walls 80a/80b and a tangential wall 80c that joins the walls 80a/80b. In this example, the cap 80 also includes an aft radial wall 80d (FIG. 3B) that is oblique to the radial walls 80a/80b and tangential wall 80c so as to form an acute corner 80e, which is the inside corner and is best shown in later FIG. 5. The walls 80a/80b/80c/80d and acute corner 80e define an interior region that corresponds in shape to the geometry of the flange 68 such that the cap 80 fits snugly over the flange 68.

As will be appreciated, the geometry of the flange 68, and thus the geometry of the cap 80, can be varied for particular implementations. The cap 80 may be designed to friction-fit on the flange 68. In some examples, the friction-fit is the exclusive attachment between the cap 80 and the flange 68, i.e., there is no bonding or the like other than that provided by the friction. In some examples, the friction-fit is not so tight as to prevent removal of the cap 80 from the flange 80. For instance, the cap 80 is non-destructively removable from the flange 68 and can be fitted and removed with the shape and function of the cap 80 remaining intact.

Figure 5:
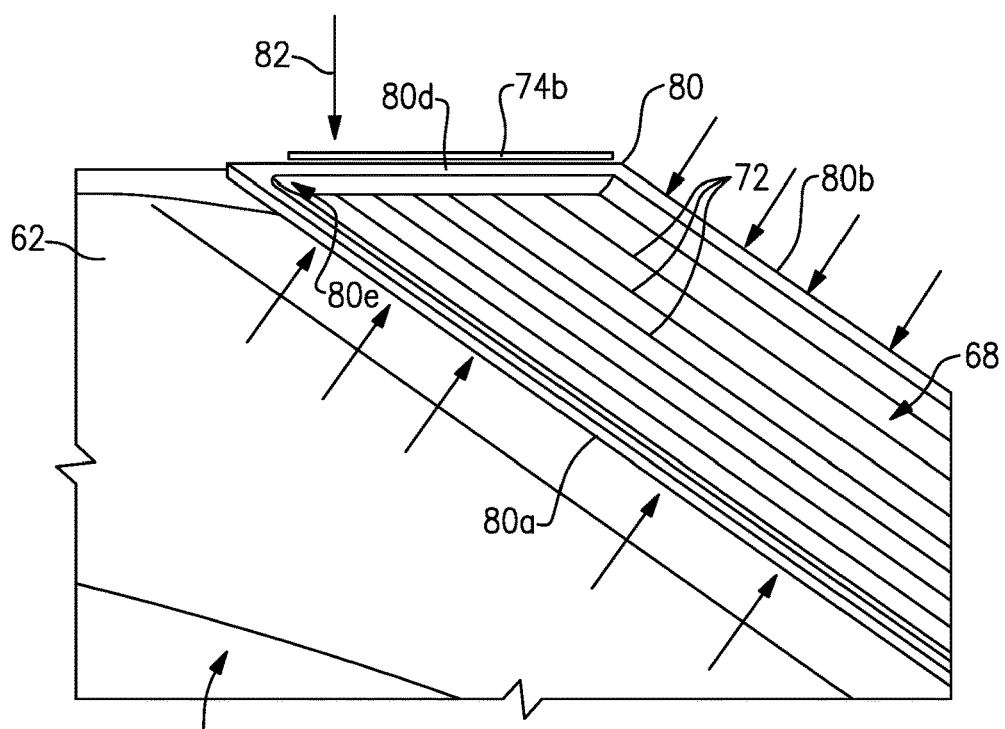
FIG. 5 illustrates another sectioned view through a flange and cap of the vane arc segment.

The cap 80 serves the anti-wear function as described above for the anti-wear element 78. Additionally, however, the cap 80 serves to mechanically constrain the flange 68. For example, FIG. 5 illustrates a sectioned radial view of the flange 68 and the cap 80. An axial load component, represented at 82, of the aerodynamic load is transmitted through the aft face of the first platform 62 and flange 68. The axial load component 82 is oblique to the orientation of the planes of the fiber plies 72 and thus tends to produce an interlaminar shear stress along the ply interfaces, as well as tensile stresses across the ply interfaces. The axial load component 82, however, is transmitted through the cap 80. The cap 80 is relatively stiff, especially in the aft region of the cap 80 wherein the junctures of the aft radial wall 80d and radial walls 80a/80b form a stiff truss structure. The stiffness of the cap 80 serves to facilitate distributing of the axial load component 82 across the flange 68. Moreover, the stiffness of the cap 80 serves to mechanically constrain deflection of the flange 68, thereby facilitating mitigation of shear and tensile strains at the ply interfaces. The cap 80 thus serves a dual function of anti-wear and stress mitigation.

In further examples, the anti-wear element 178 (or 78) is configured to also serve a shim functionality. For example, the vane arc segments 60/160 are precisely oriented in the engine 20 in order to provide a required flow area (throat area between vanes). In this regard, a family of classified anti-wear elements 178 can be provided wherein the elements 178 of the family are all designed to fit on the same flange geometry but that are classified with different wall thicknesses—for example two, or three, or four different sizes. When assembling a vane arc segment 160 into the vane ring assembly 58, the segment 160 may require adjustment to obtain a targeted position and thus a targeted flow area. For each segment 160, an element 178 can be selected from the family and serve as a shim to adjust position of that segment 160. Thus, where relatively larger adjustment is needed, a larger sized element is selected, and where relatively smaller adjustment is needed a smaller sized element 178 is selected. The different sizes of elements 178 can be achieved by wall thickness of the element 178. For instance, the thicknesses of one or more of the walls 80a/80b/80c/80d are classified with different sizes to enable adjustment in various directions that correspond to the thickness direction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   an airfoil piece including a first platform, a second platform, and an airfoil section between the first platform and the second platform, at least the first platform being formed of a fiber-reinforced composite (FRC) and defining a radial flange, the radial flange defining opposed circumferential flange sides and a radial face joining the opposed circumferential flange sides, the radial face having a curved profile; and
   a cap fitted on the radial flange.

2. The vane arc segment as recited in claim 1, wherein the cap is formed of a superalloy.

3. The vane arc segment as recited in claim 1, wherein the cap is friction-fit on the radial flange.

4. The vane arc segment as recited in claim 1, wherein the cap includes an acute corner.

5. The vane arc segment as recited in claim 1, wherein the cap includes first and second radial walls and a tangential wall joining the first and second radial walls.

6. The vane arc segment as recited in claim 5, wherein the cap mechanically constrains the radial flange.

7. The vane arc segment as recited in claim 1, wherein the FRC is a ceramic matrix composite.

8. A vane ring assembly comprising:
   an airfoil piece including a first platform, a second platform, and an airfoil section between the first platform and the second platform, the first platform defining a radial flange, the first platform being formed of a ceramic matrix composite;
   a mating component adjacent the radial flange; and
   an anti-wear element in an interface between the radial flange and the mating component the anti-wear element including first and second radial walls that provide circumferential sides of the anti-wear element, a tangential wall joining the first and second radial walls, and an aft wall joining the first and second radial walls and the tangential wall.

9. The assembly as recited in claim 8, wherein the anti-wear element is formed of a superalloy.

10. The assembly as recited in claim 8, wherein the interface is a radial interface.

11. The assembly as recited in claim 8, wherein the anti-wear element is friction-fit on the radial flange.

12. A gas turbine engine comprising:
    first and second support structures; and
    vane arc segments supported between the first and second support structures, each said vane arc segment including
       an airfoil piece having a first platform, a second platform, and an airfoil section between the first platform and the second platform, at least the first platform being formed of a fiber-reinforced composite (FRC) and defining a radial flange, the radial flange defining opposed circumferential flange sides and a radial face joining the opposed circumferential flange sides, the radial face having a curved profile, and
       a cap fitted on the radial flange.

13. The engine as recited in claim 12, wherein the cap is non-destructively removable from the radial flange.

14. The engine as recited in claim 13, wherein the cap is formed of a superalloy and is friction-fit on the radial flange.

15. The engine as recited in claim 14, wherein the FRC is a laminate that includes radially oriented fiber plies and the cap mechanically constrains the radial flange.

16. The vane arc segment as recited in claim 1, wherein the curved profile is a cylindrical surface segment.

17. The vane arc segment as recited in claim 1, wherein the FRC is a laminate of fiber plies, and the fiber plies in the radial flange are radially oriented at a radial face of the radial flange.

18. The vane arc segment as recited in claim 1, wherein the first platform has first and second circumferential mate faces, forward and aft faces, an inner side from which the airfoil section extends, and an outer side opposite the inner side, and the radial flange is on the outer side and extends along at least 50% of an extent of the first circumferential mate face in a direction between the forward and aft faces.

19. The assembly as recited in claim 8, wherein the aft wall, the first and second radial walls, and the tangential wall define an inside acute corner.

20. The assembly as recited in claim 8, wherein the radial flange defines opposed circumferential flange sides and a radial face joining the opposed circumferential flange sides, and the radial face has a curved profile of a cylindrical surface segment.

* * * * *